US011410319B2

(12) United States Patent
Chen et al.

(10) Patent No.: US 11,410,319 B2
(45) Date of Patent: Aug. 9, 2022

(54) HYBRID VIDEO SEGMENTATION AIDED BY OPTICAL FLOW FOR OBJECTS IN MOTION

(71) Applicants: Sony Corporation, Tokyo (JP); Sony Pictures Entertainment Inc., Culver City, CA (US)

(72) Inventors: Mengyu Chen, Santa Barbara, CA (US); Miaoqi Zhu, Studio City, CA (US); Yoshikazu Takashima, Los Angeles, CA (US); Ouyang Chao, Torrance, CA (US); Daniel De La Rosa, Los Angeles, CA (US); Michael Lafuente, Los Angeles, CA (US); Stephen Shapiro, Torrance, CA (US)

(73) Assignees: Sony Group Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 0 days.

(21) Appl. No.: 17/179,094

(22) Filed: Feb. 18, 2021

(65) Prior Publication Data
US 2022/0005206 A1    Jan. 6, 2022

Related U.S. Application Data

(60) Provisional application No. 63/047,753, filed on Jul. 2, 2020.

(51) Int. Cl.
*G06T 7/215*    (2017.01)
*G06T 7/13*    (2017.01)
(Continued)

(52) U.S. Cl.
CPC .............. *G06T 7/215* (2017.01); *G06T 5/009* (2013.01); *G06T 7/13* (2017.01); *G06T 7/174* (2017.01); *G06T 7/269* (2017.01)

(58) Field of Classification Search
CPC ... G06T 7/11; G06T 2207/10024; G06T 7/10; G06T 2207/10048; G06T 7/194;
(Continued)

(56) References Cited

U.S. PATENT DOCUMENTS 9,734,551 B1 *   8/2017  Esteban .................... G06T 5/00
10,402,986 B2    9/2019  Ray et al.
(Continued)

OTHER PUBLICATIONS

Video Segmentation via Object Flow (Year: 2016).*
(Continued)

*Primary Examiner* — Nizar N Sivji
(74) *Attorney, Agent, or Firm* — Procopio, Cory, Hargreaves & Savitch LLP

(57) ABSTRACT

Methods and systems including: applying a gamma adjustment to frames of an input video with particular values of parameters to generate at least one set of gamma-adjusted frames to generate at least one set of gamma-adjusted frames; applying a segmentation technique to the at least one set of gamma-adjusted frames to generate segmentation masks; applying an optical flow technique to the at least one set of the gamma-adjusted frames to generate optical flow maps; and combining the segmentation masks and the optical flow maps to generate hybrid segmentation masks.

20 Claims, 8 Drawing Sheets

(51) Int. Cl.
*G06T 5/00* (2006.01)
*G06T 7/269* (2017.01)
*G06T 7/174* (2017.01)

(58) Field of Classification Search
CPC .......... G06T 7/215; G06T 5/009; G06T 7/13; G06T 7/174; G06T 7/269; G06T 2207/30196; G06T 7/246
See application file for complete search history.

(56) References Cited

U.S. PATENT DOCUMENTS

| | | | |
|---|---|---|---|
| 2003/0081836 A1* | 5/2003 | Averbuch | G06T 7/174 382/199 |
| 2014/0368661 A1 | 12/2014 | Angot et al. | |
| 2017/0372479 A1* | 12/2017 | Somanath | G06T 7/11 |
| 2019/0355128 A1 | 11/2019 | Grauman et al. | |
| 2020/0074642 A1* | 3/2020 | Wilson | G06T 7/194 |

OTHER PUBLICATIONS

Suyog Dutt Jain et al. FusionSeg: Learning to combine motion and appearance for fully automatic segmentation of generic objects in videos. 2017 IEEE Conference on Computer Vision and Pattern Recognition. DOI 10.1109/CVPR.2017.228.
International search report from PCT/US2021/035029 dated Sep. 2, 2021.
Written opinion from PCT/US2021/035029 dated Sep. 2, 2021.

* cited by examiner

HYBRID VIDEO SEGMENTATION AIDED BY OPTICAL FLOW FOR OBJECTS IN MOTION

CROSS-REFERENCE TO RELATED APPLICATIONS

This application claims the benefit of priority under 35 U.S.C. § 119(e) of U.S. Provisional Patent Application No. 63/047,753, filed Jul. 2, 2020, entitled "Hybrid Video Segmentation Method Aided by Optical Flow." The disclosure of the above-referenced application is incorporated herein by reference.

BACKGROUND

Field

The present disclosure relates to video segmentation, and more specifically, to generating improved segmentation masks.

Background

Conventional machine learning (ML) based segmentation techniques using masks generate good enough results for non-professional media contents, such as low-resolution videos on social media. However, the quality of segmentation masks may not be high enough to meet the requirements of professional image/video processing tasks. For example, the edge clarity varies from frame to frame, which may cause incorrectly-inferred sub-pixels to appear in the masked area. Thus, the ML-based segmentation techniques may fail to produce reliable and/or consistent segmentation masks in certain scenarios. These scenarios may include: High resolution images (e.g., HD, 4K); Dynamic scenes, particularly those that have fast-moving objects; Color-graded contents (e.g., low brightness, similar texture); Dark scenes; and Multiple target objects in the scene to be segmented independently.

SUMMARY

The present disclosure provides for generating improved segmentation masks for segmenting objects in motion.

In one implementation, a method is disclosed. The method includes: applying a gamma adjustment to frames of an input video with particular values of parameters to generate at least one set of gamma-adjusted frames; applying a segmentation technique to the at least one set of gamma-adjusted frames to generate segmentation masks; applying an optical flow technique to the at least one set of the gamma-adjusted frames to generate optical flow maps; and combining the segmentation masks and the optical flow maps to generate hybrid segmentation masks.

In one implementation, combining the segmentation masks and the optical flow maps includes multiplying a pixel-wise code value for red, green, and blue components for sub-pixels of objects which have been applied with the segmentation technique. In one implementation, the segmentation technique includes: categorizing each frame of the at least one set of gamma-adjusted frames into a class; detecting objects within each frame and drawing boundaries around the objects; and identifying and corresponding parts of each frame to the objects. In one implementation, each flow map of the optical flow maps is a map of motion of the objects between consecutive frames of the at least one set of gamma-adjusted frames. In one implementation, the at least one set of gamma-adjusted frames comprises a first set of gamma-adjusted frames and a second set of gamma-adjusted frames. In one implementation, the first set of gamma-adjusted frames is generated for the segmentation technique. In one implementation, the second set of gamma-adjusted frames is generated for the optical flow technique. In one implementation, the method further includes: applying the gamma adjustment to the frames of the input video with different values of the parameters to generate different sets of gamma-adjusted frames and repeating the applications and the combination of the segmentation technique and the optical flow technique, when a misalignment exists between the segmentation masks and the optical flow maps.

In another implementation, a system is disclosed. The system includes: a gamma function applicator to apply a gamma adjustment to frames of an input video using a set of parameters to generate at least one set of gamma-adjusted frames; a segmentation mask generator to apply a segmentation technique to the at least one set of gamma-adjusted frames to generate segmentation masks; an optical flow map generator to apply an optical flow technique to the at least one set of the gamma-adjusted frames to generate optical flow maps; and a combiner to combine the segmentation masks and the optical flow maps to generate hybrid segmentation masks.

In one implementation, the system further includes a processor to receive the hybrid segmentation masks and to determine if the combiner produced an acceptable alignment between the segmentation masks and the optical flow maps, the processor to instruct the gamma function applicator to use another set of values of the parameters to improve the alignment between the segmentation masks and the optical flow maps and to repeat processes performed by the segmentation mask generator and the optical flow map generator, if the alignment is not acceptable. In one implementation, the segmentation mask generator includes: a categorizer to categorize each frame of the at least one set of gamma-adjusted frames into a class; a detector to detect objects within each frame and drawing boundaries around the objects; and an identifier to identify and correspond parts of each frame to the objects. In one implementation, each flow map of the optical flow maps is a map of motion of the objects between consecutive frames of the at least one set of gamma-adjusted frames. In one implementation, the at least one set of gamma-adjusted frames comprises a first set of gamma-adjusted frames and a second set of gamma-adjusted frames. In one implementation, the first set of gamma-adjusted frames is generated for the segmentation technique. In one implementation, the second set of gamma-adjusted frames is generated for the optical flow technique.

In a further implementation, a non-transitory computer-readable storage medium storing a computer program to generate segmentation masks is disclosed. The computer program includes executable instructions that cause a computer to: apply a gamma adjustment to frames of an input video with particular values of parameters to generate at least one set of gamma-adjusted frames; apply a segmentation technique to the at least one set of gamma-adjusted frames to generate segmentation masks; apply an optical flow technique to the at least one set of the gamma-adjusted frames to generate optical flow maps; and combine the segmentation masks and the optical flow maps to generate hybrid segmentation masks.

In one implementation, the segmentation technique includes executable instructions that cause the computer to: categorize each frame of the at least one set of gamma-adjusted frames into a class; detect objects within each frame and drawing boundaries around the objects; and identify and correspond parts of each frame to the objects. In one implementation, each flow map of the optical flow maps is a map of motion of the objects between consecutive frames of the at least one set of gamma-adjusted frames. In one implementation, the at least one set of gamma-adjusted frames comprises a first set of gamma-adjusted frames and a second set of gamma-adjusted frames, wherein the first set of gamma-adjusted frames is generated for the segmentation technique, and wherein the second set of gamma-adjusted frames is generated for the optical flow technique. In one implementation, the computer program further includes executable instructions that cause the computer to: apply the gamma adjustment to the frames of the input video with different values of the parameters to generate different sets of gamma-adjusted frames and repeat the applications and the combination of the segmentation technique and the optical flow technique, when a misalignment exists between the segmentation masks and the optical flow maps.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the conventional ML-based segmentation techniques may fail to produce reliable and/or consistent segmentation masks in scenarios involving high resolution images, dynamic scenes including fast-moving objects, color-graded contents, dark scenes, and/or multiple target objects in the scene.

Certain implementations of the present disclosure provide methods and systems for using a hybrid segmentation and optical flow technique to generate a more consistent and accurate segmentation mask. Further, an image preprocessing technique including gamma correction is used to ensure the effectiveness of the technique. Although the optimal input video for a segmentation mask generation process and an optical flow map generation process may be different, each input video can be adjusted (e.g. with gamma correction) to achieve improved combined performance of the stacked layer segmentation result.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, to improve the consistency and accuracy of a segmentation mask, following steps may be taken: (a) apply the gamma function to the raw frames to fine-tune the brightness and/or contrast; (b) apply a segmentation technique to the gamma-adjusted frames to generate the segmentation mask; (c) apply an optical flow technique to the gamma-adjusted frames to generate an optical flow map; and (d) stack (or combine) the segmentation mask and the optical flow map to generate a hybrid segmentation mask. If the stacking process of step (d) produces unacceptable alignment, then the image pre-processing (e.g. brightness and contrast control) of step (a) is adjusted to improve the alignment. The term "unacceptable alignment" refers to the segmentation mask and the optical flow map being out of alignment by a predefined number of pixels along the boundary, which also results in visual misalignment. In one implementation, the predefined number of pixels is five.

Figure 1:
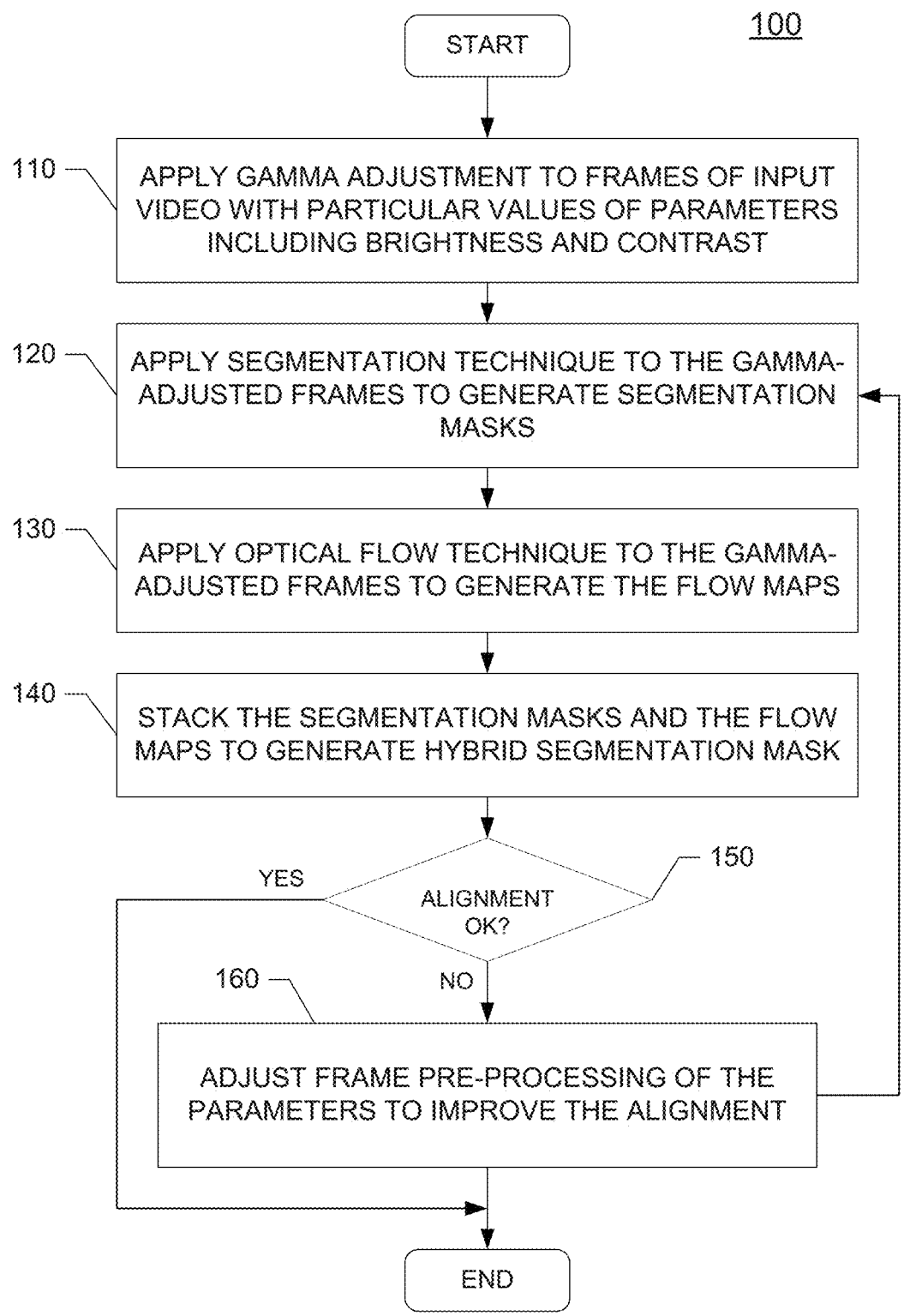
FIG. 1 is a flow diagram of a method for generating a segmentation mask that is more consistent and accurate in accordance with one implementation of the present disclosure.

FIG. 1 is a flow diagram of a method 100 for generating segmentation masks that are more consistent and accurate in accordance with one implementation of the present disclosure. In one implementation, a hybrid ML-based segmentation and optical flow techniques are used to generate the segmentation masks.

Figure 2:
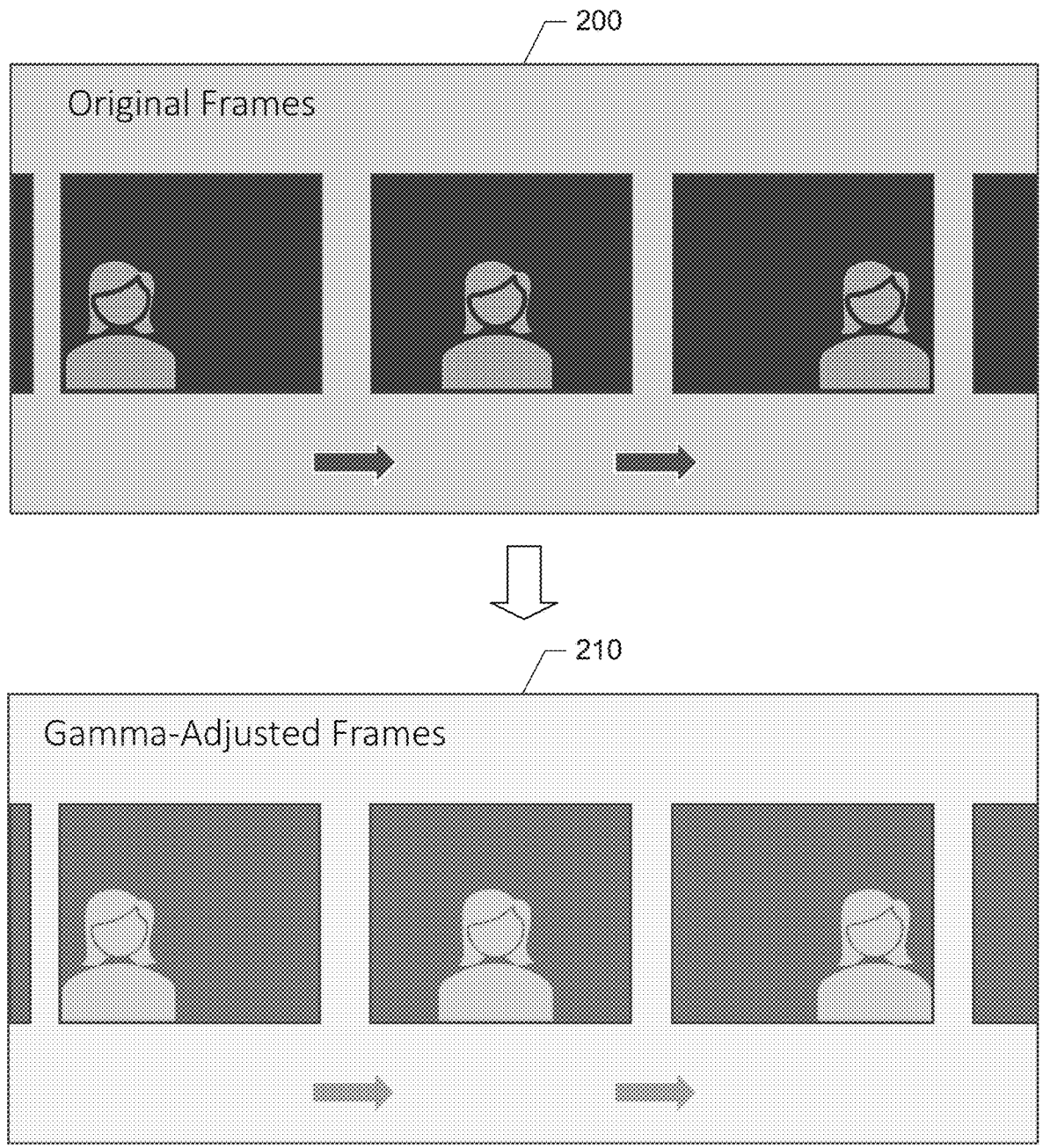
FIG. 2 shows the original frames of the input video and the gamma-adjusted frames of the second video.

In the illustrated implementation of FIG. 1, an input video is received and the gamma adjustment is applied, at step 110, to frames of the input video with particular values of parameters (including brightness and contrast) to generate at least one set of gamma-adjusted frames. The application of the gamma function generates a second video with gamma-adjusted frames. In one implementation, the application of the gamma function or gamma adjustment refers to non-linear adjustment of the brightness and contrast to enhance the mid-tones while lessening the effect on the extreme dark and light points. Accordingly, by applying the gamma adjustment, the brightness and contrast are enhanced to make the output images appear brighter and more natural. FIG. 2 shows the original frames 200 of the input video and the gamma-adjusted frames 210 of the second video.

Figure 3:
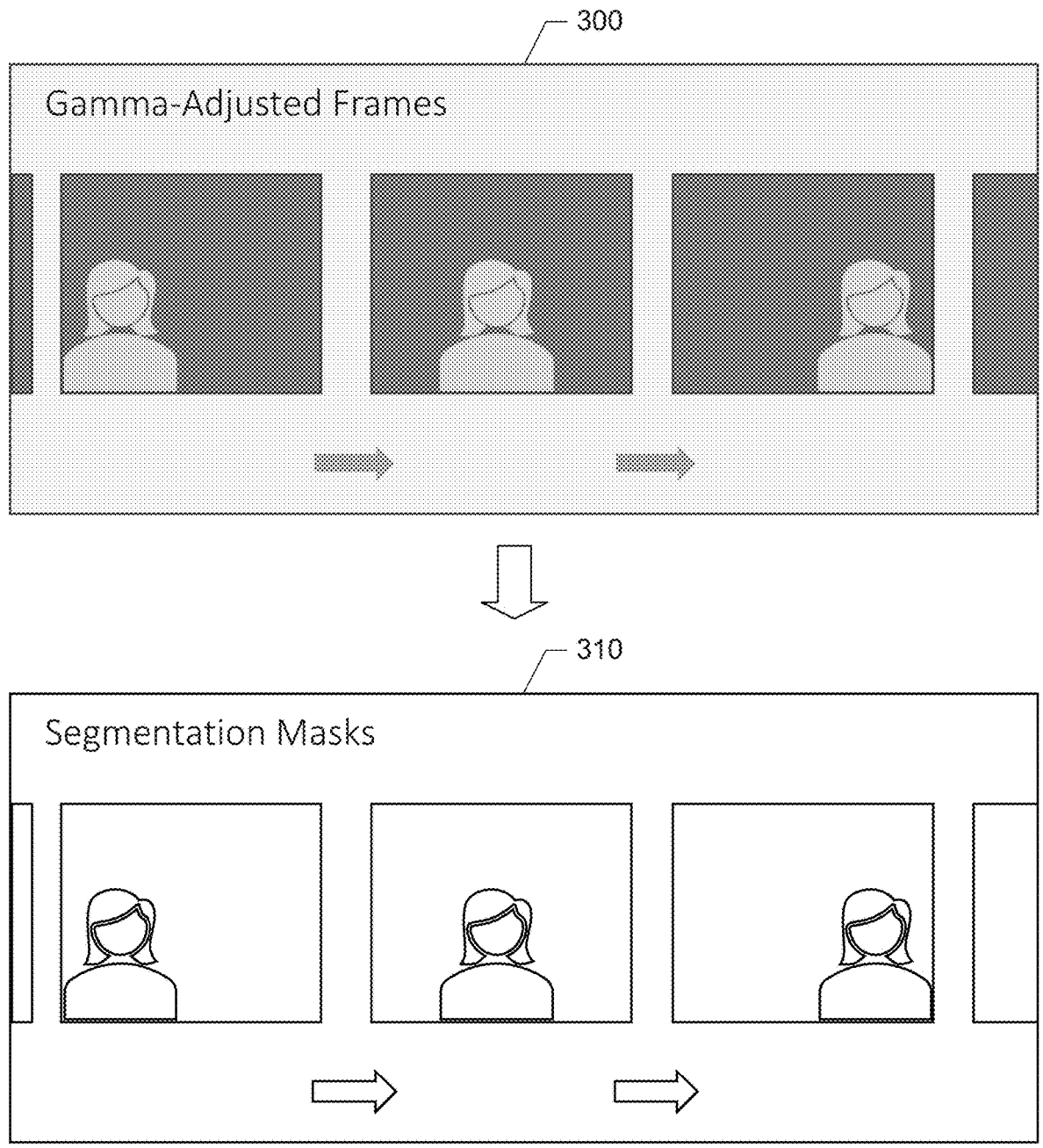
FIG. 3 shows the gamma-adjusted frames and the generated segmentation masks.

In the illustrated implementation of FIG. 1, a segmentation technique is applied, at step 120, to the gamma-adjusted frames to generate the segmentation masks. In one implementation, the segmentation technique may include: categorizing an image into a class (e.g., people, bicycle, mountain, etc.); detecting objects within the image and drawing boundaries around the objects; and identifying and corresponding the parts (or "sub-pixels") of the image to the objects. FIG. 3 shows the gamma-adjusted frames 300 and the generated segmentation masks 310.

Figure 4A:
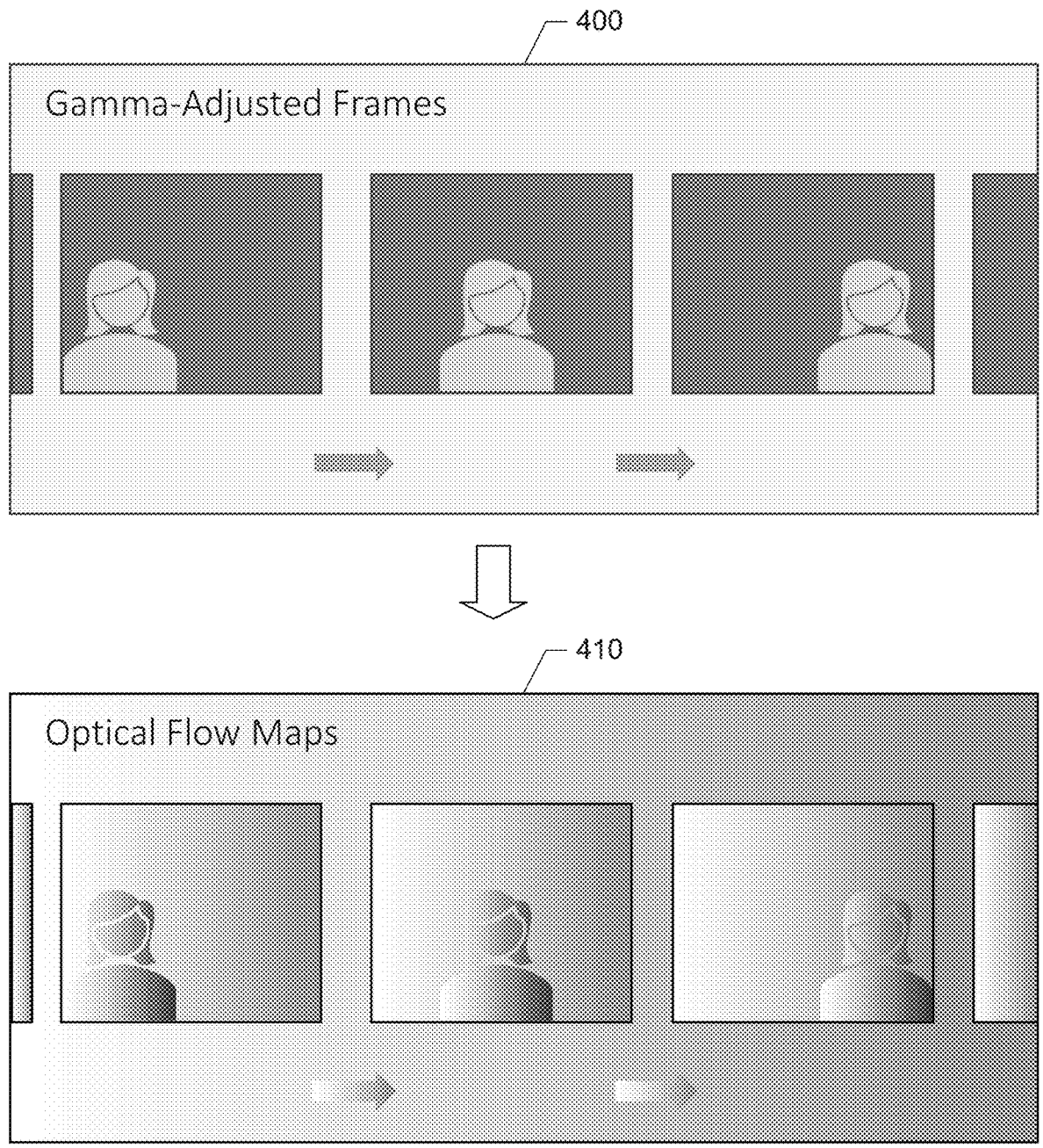
FIG. 4A shows one implementation of the gamma-adjusted frames and the generated optical flow maps.
Figure 4B:
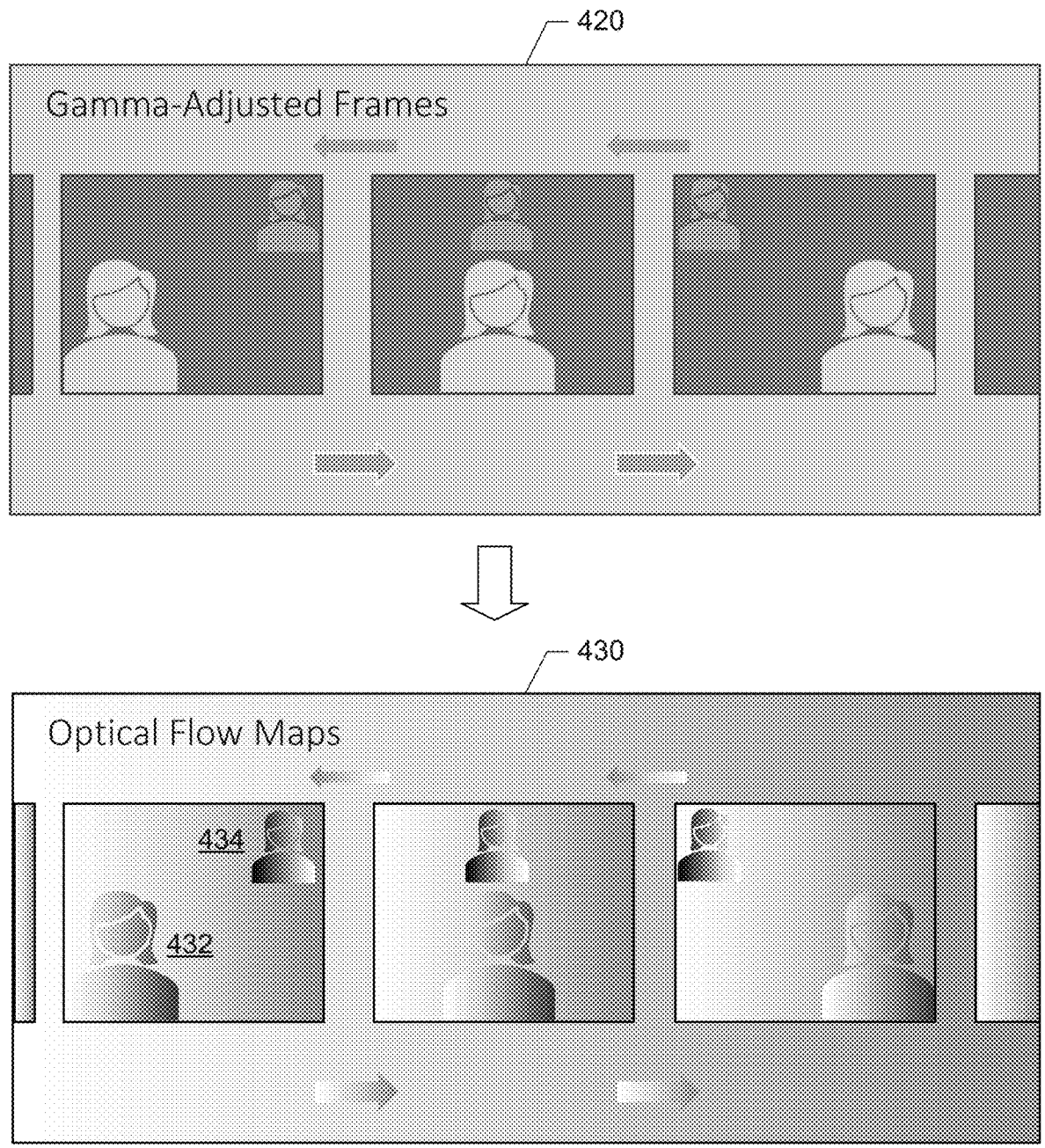
FIG. 4B shows the optical flow maps generated from the gamma-adjusted frames when the frames include multiple moving objects.

In the illustrated implementation of FIG. 1, an optical flow technique is applied, at step 130, to the gamma-adjusted frames to generate optical flow maps. In one implementation, an optical flow map is a map of the motion of object(s) between consecutive frames of a video caused by the movement between the camera and the object(s). For example, in one implementation, an optical flow map technique may include: assigning a grayscale level to each vector based on its orientation; and varying the intensity of the grayscale level based on its norm. FIG. 4A shows one implementation of the gamma-adjusted frames 400 and the generated optical flow maps 410. In another implementation, FIG. 4B shows the optical flow maps 430 generated from the gamma-adjusted frames 420 when the frames include multiple moving objects. The optical flow maps 430 in FIG. 4B shows the objects and/or persons 432, 434, moving in different directions in the frames, indicated with different grayscales.

Figure 5:
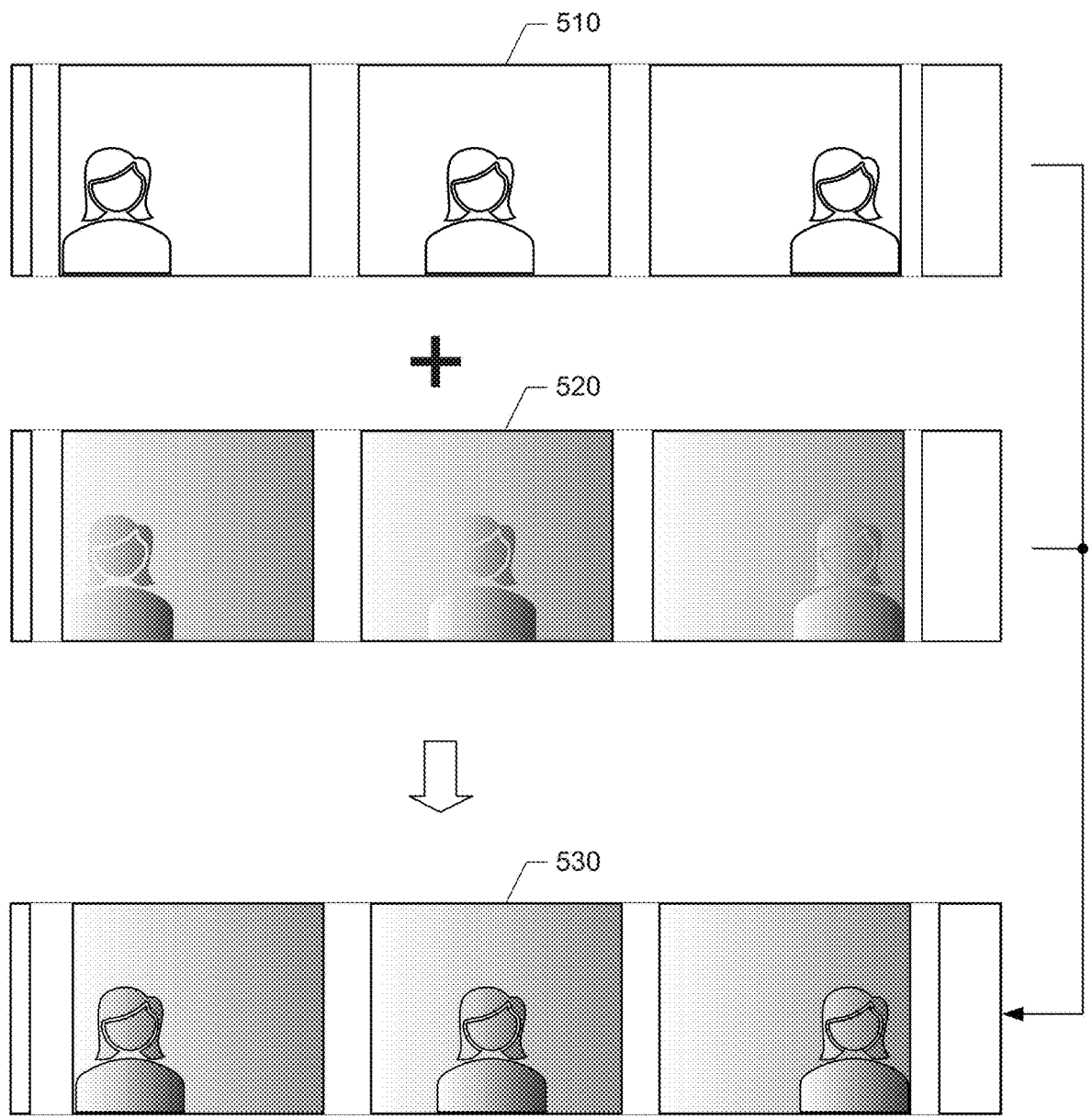
FIG. 5 shows the segmentation masks, the optical flow maps, and the generated hybrid segmentation masks.

In the illustrated implementation of FIG. 1, the segmentation masks and the optical flow maps are stacked or combined, at step 140, to generate hybrid segmentation masks. In one implementation, the stacking process is a pixel-wise code value multiplication for Red, Green, and Blue components, respectively, in which the multiplication only applies to the segmented sub-pixels of the object of a certain class in the segmentation map. As stated above, the two source images for the stacking process include the segmentation masks and the optical flow map. For the segmentation purpose, the moving objects in the frames are of interest. FIG. 5 shows the segmentation masks 510, the optical flow maps 520, and the generated hybrid segmentation masks 530.

As noted above, the optimal video input to the segmentation mask generation process (shown in FIG. 3) and the optical flow map generation process (shown in FIGS. 4A and 4B) may be different. Thus, each video should be adjusted (with appropriate but different gamma corrections) to achieve the improved performance of the stacked layer segmentation result.

In the illustrated implementation of FIG. 1, if the stacking process of step 140 (shown in FIG. 5) produces an unacceptable alignment, at step 150, the frame pre-processing (e.g. brightness and contrast control) is adjusted, at step 160, to improve the alignment. In one implementation, the frame pre-processing after step 140 may include another gamma correction but varying the amount of correction. In another implementation, another pre-processing method using a 3-D Lookup Table (LUT) is used. The goal of this step is to normalize the look of the color-graded images such that the existing segmentation and/or optical flow algorithm can produce accurate results. Thus, step 160 includes applying the gamma adjustment to the frames of the input video with different values for the parameters to generate different sets of gamma-adjusted frames, and repeating the applications and the combination of the segmentation technique and the optical flow technique, when a misalignment exists between the segmentation masks and the optical flow maps. In one implementation, the parameters include brightness and/or contrast. In another implementation, the parameters include luminance and/or hue. As stated above, the term "unacceptable alignment" refers to the segmentation mask and the optical flow map being out of alignment by a predefined number of pixels 5) along the boundary, which also results in visual misalignment.

The method 100 then moves to repeat steps 120 through step 140. Otherwise, if the stacking process of step 140 produces an acceptable alignment, at step 150, the method 100 is terminated with the generated hybrid segmentation masks 530 used to perform the video segmentation.

Figure 6:
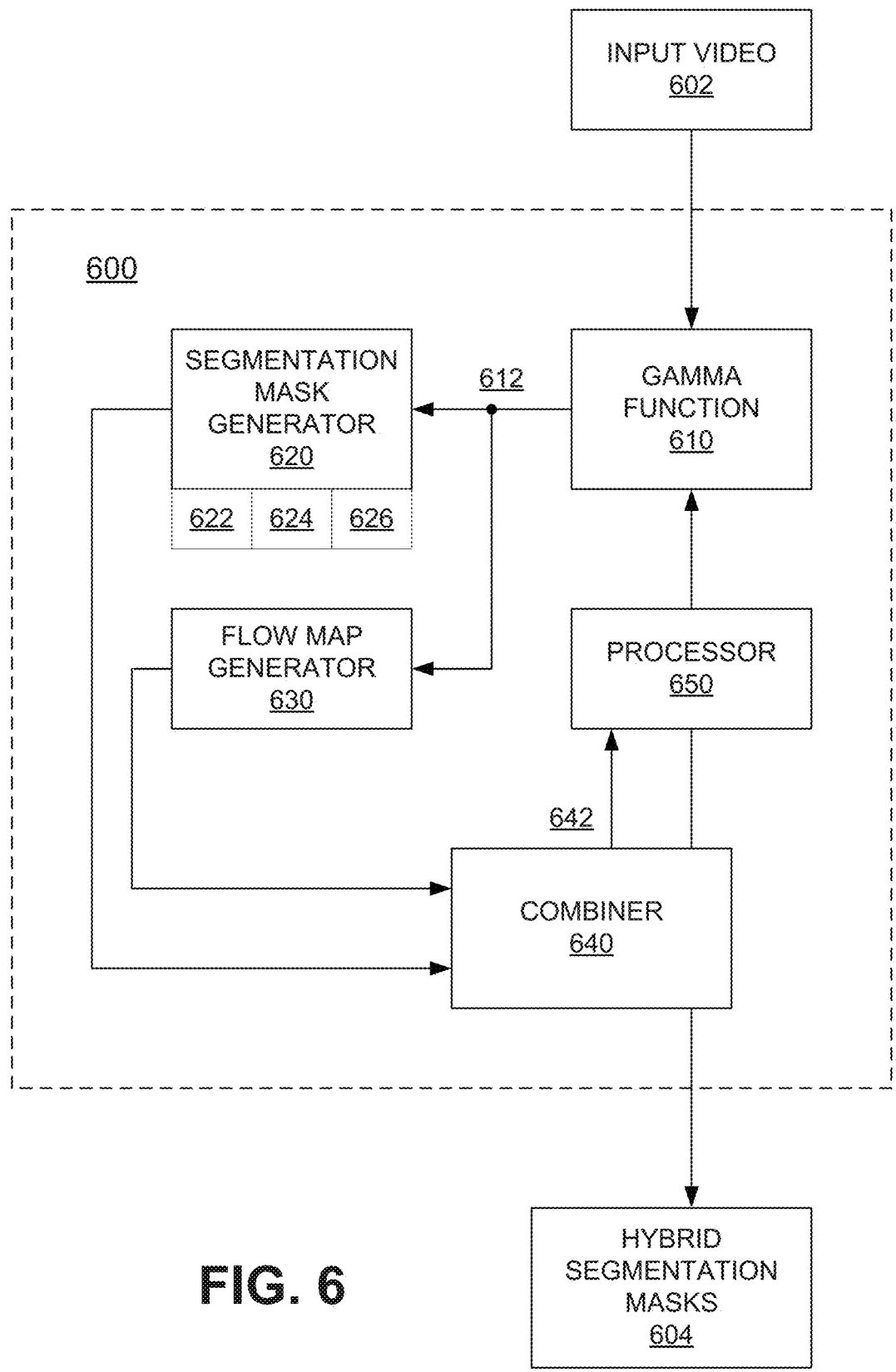
FIG. 6 is a block diagram of a segmentation mask generation system in accordance with one implementation of the present disclosure.

FIG. 6 is a block diagram of a segmentation mask generation system 600 in accordance with one implementation of the present disclosure. In the illustrated implementation of FIG. 6, the segmentation mask generation system 600 includes a gamma function applicator 610, a segmentation mask generator 620, an optical flow map generator 630, a combiner 640, and a processor 650. In one implementation, the segmentation mask generation system 600 is a system configured entirely with hardware including one or more digital signal processors (DSPs), general purpose microprocessors, application specific integrated circuits (ASICs), field programmable logic arrays (FPGAs), or other equivalent integrated or discrete logic circuitry. In another implementation, the segmentation mask generation system 600 is configured with a combination of hardware and software.

In FIG. 6, the gamma function applicator 610 receives the input video 602 and applies the gamma function to the frames of the input video 602 to fine-tune the brightness and/or contrast of the input video 602, especially the moving objects. The gamma function applicator 610 generates a second video 612 with gamma-adjusted frames. In one implementation, the segmentation mask generator 620 applies a segmentation technique to the gamma-adjusted frames to generate the segmentation masks. In one implementation, the segmentation mask generator 620 includes: a categorizer 622 to categorize each frame of the at least one set of gamma-adjusted frames into a class; a detector 624 to detect objects within each frame and drawing boundaries around the objects; and an identifier 626 to identify and correspond parts of each frame to the objects. In one implementation, the optical flow map generator 630 applies an optical flow technique to the gamma-adjusted frames to generate the optical flow maps. The combiner 640 stacks or combines the segmentation masks and the optical flow maps to generate hybrid segmentation masks 604.

As noted above, the optimal gamma-adjusted frames of the second video 612 for the segmentation mask generator 620 may be different than the optimal gamma-adjusted frames of the second video 612 for the optical flow map generator 630 may be different. Thus, the gamma-adjusted frames of the second video 612 for each of the generators 620, 630 should be adjusted (with appropriate but different gamma corrections) to achieve the improved performance of the stacked layer segmentation result.

In FIG. 6, the hybrid segmentation masks 642 generated by the combiner 640 is received by the processor 650, which checks to determine if the combining process produced an acceptable alignment. If not, the processor 650 instructs the gamma function applicator 610 to adjust the frame pre-processing (e.g. brightness and contrast control) to improve the alignment and to repeat the processes performed by the segmentation mask generator 620 and the optical flow map generator 630. Otherwise, if the processor 650 determines that the combiner 640 produced an acceptable alignment, the hybrid segmentation masks 604 generated by the combiner 640 is output to be used to perform the video segmentation.

Figure 7A:
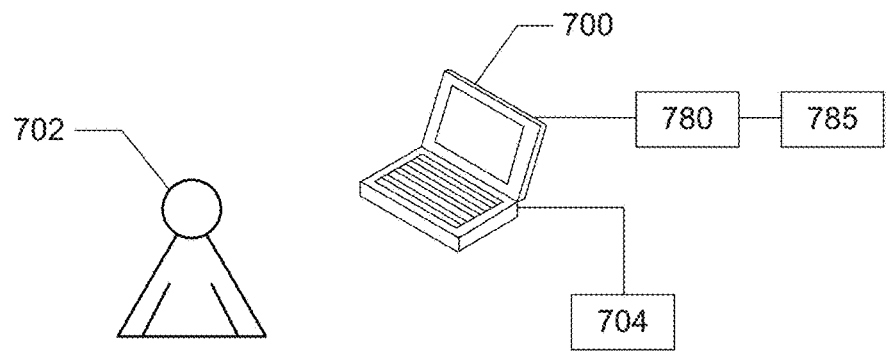
FIG. 7A is a representation of a computer system and a user in accordance with an implementation of the present disclosure.

FIG. 7A is a representation of a computer system 700 and a user 702 in accordance with an implementation of the present disclosure. The user 702 uses the computer system 700 to implement a video application 790 for generating a segmentation mask with respect to the method 100 of FIG. 1 and the system 600 of FIG. 6.

Figure 7B:
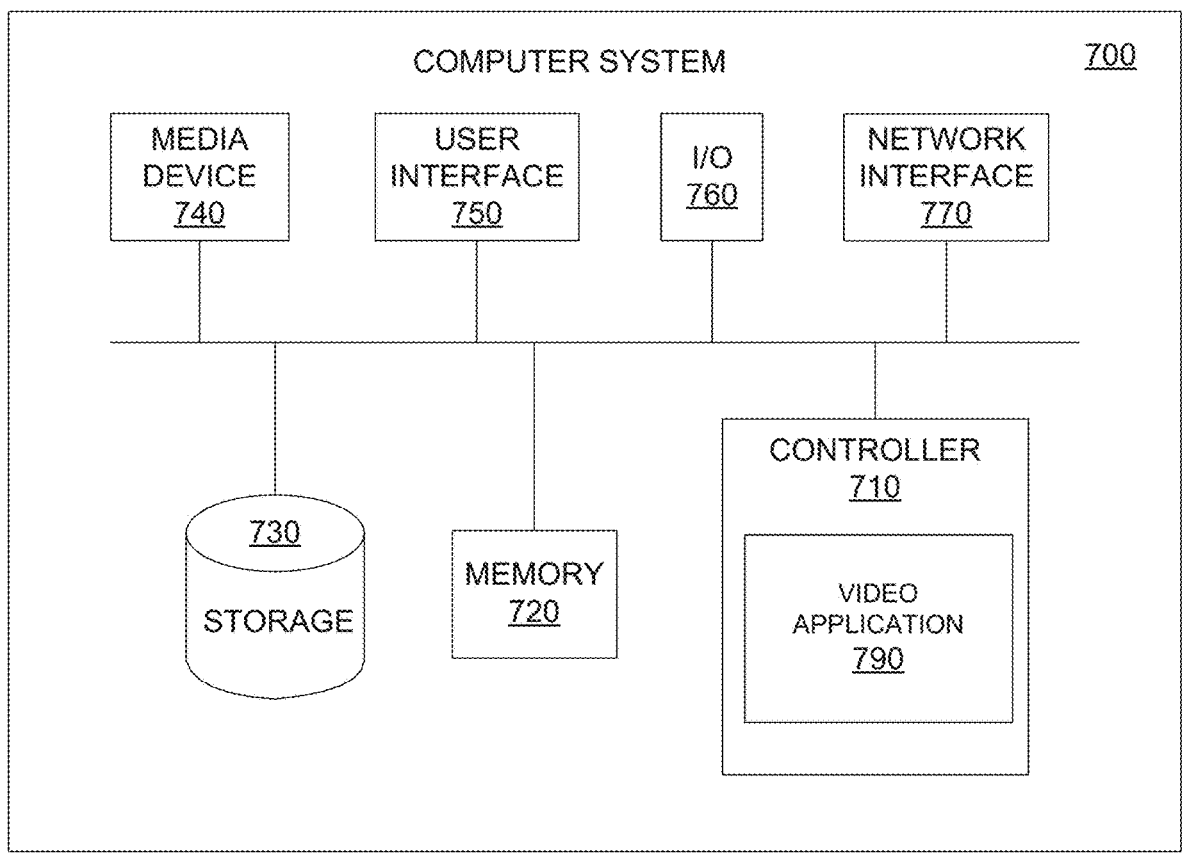
FIG. 7B is a functional block diagram illustrating the computer system hosting the video application in accordance with an implementation of the present disclosure.

The computer system 700 stores and executes the video application 790 of FIG. 7B. In addition, the computer system 700 may be in communication with a software program 704. Software program 704 may include the software code for the video application 790. Software program 704 may be loaded on an external medium such as a CD, DVD, or a storage drive, as will be explained further below.

Furthermore, computer system 700 may be connected to a network 780. The network 780 can be connected in various different architectures, for example, client-server architecture, a Peer-to-Peer network architecture, or other type of architectures. For example, network 780 can be in communication with a server 785 that coordinates engines and data used within the video application 790. Also, the network can be different types of networks. For example, the network 780 can be the Internet, a Local Area Network or any variations of Local Area Network, a Wide Area Network, a Metropolitan Area Network, an Intranet or Extranet, or a wireless network.

FIG. 7B is a functional block diagram illustrating the computer system 700 hosting the video application 790 in accordance with an implementation of the present disclosure. A controller 710 is a programmable processor and controls the operation of the computer system 700 and its components. The controller 710 loads instructions (e.g., in the form of a computer program) from the memory 720 or an embedded controller memory (not shown) and executes these instructions to control the system. In its execution, the controller 710 provides the video application 790 with a software system, such as to enable generation of a segmentation mask that is more consistent and accurate. Alternatively, this service can be implemented as separate hardware components in the controller 710 or the computer system 700.

Memory 720 stores data temporarily for use by the other components of the computer system 700. In one implementation, memory 720 is implemented as RAM. In another implementation, memory 720 also includes long-term or permanent memory, such as flash memory and/or ROM.

Storage 730 stores data either temporarily or for long periods of time for use by the other components of the computer system 700. For example, storage 730 stores data used by the video application 790. In one implementation, storage 730 is a hard disk drive.

The media device 740 receives removable media and reads and/or writes data to the inserted media. In one example, the media device 740 is an optical disc drive.

The user interface 750 includes components for accepting user input from the user of the computer system 700 and presenting information to the user 702. In one implementation, the user interface 750 includes a keyboard, a mouse, audio speakers, and a display. The controller 710 uses input from the user 702 to adjust the operation of the computer system 700.

The I/O interface 760 includes one or more I/O ports to connect to corresponding I/O devices, such as external storage or supplemental devices (e.g., a printer or a PDA). In one implementation, the ports of the I/O interface 760 include ports such as: USB ports, PCMCIA ports, serial ports, and/or parallel ports. In another implementation, the I/O interface 760 includes a wireless interface for communication with external devices wirelessly.

The network interface 770 includes a wired and/or wireless network connection, such as an RJ-45 or "Wi-Fi" interface (including, but not limited to 802.11) supporting an Ethernet connection.

The computer system 700 includes additional hardware and software typical of computer systems (e.g., power, cooling, operating system), though these components are not specifically shown in FIG. 7B for simplicity. In other implementations, different configurations of the computer system can be used (e.g., different bus or storage configurations or a multi-processor configuration).

The present disclosure describes a hybrid method that utilizes segmentation and optical flow techniques to generate a more consistent and accurate segmentation mask. Further, an image preprocessing technique such as gamma correction is used to enhance the effectiveness of the method. The advantages of the hybrid method include: (a) the efficiency of applying gamma correction on semantic understanding of the scene structure to deal with the source image which was originally difficult to analyze (e.g. dark scenes); the efficiency of a good segmentation network when the scene is static; the accuracy of a good optical flow network when depicting the motion vectors in a dynamic scene; the capability of the optical flow to identify multiple moving objects as independent objects; and independently optimizing the gamma correction for segmentation engine and optical flow engine to maximize the performance of each engine.

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Accordingly, additional variations and implementations are also possible. For example, one implementation utilizes multiple video segmentation approaches, that have advantages in the processing of different types of source images, to provide consistent and stable video segmentation result across the variety of video scenes. Also, input image preprocessing is optimized to each of video segmentation approaches, to maximize the total performance of hybrid video segmentation process outcome. One part of video segmentation approach is optical flow-based model, which has advantage in the scene with movement as well as independent identification of multiple objects.

Higher fidelity video segmentation engine trained with the above-described solution can be used to automate actor and object masking process in the visual effects (VFX) process of content creation. Such masking is currently done manually by human, but the time-consuming process can be automated using machine learning based tool.

Further variations and implementations include: removing the need to use green screen in content creation; image segmentation and shape recognition for robotics, autonomous driving, factory automation; enhancement of object recognition performance by focusing on the target object; and enhancement of image matching performance by utilizing the object segmentation.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method, comprising:
   applying a gamma adjustment to frames of an input video with particular values of parameters to generate at least one set of gamma-adjusted frames;
   applying a segmentation technique to the at least one set of gamma-adjusted frames to generate segmentation masks;
   applying an optical flow technique to the at least one set of the gamma-adjusted frames to generate optical flow maps; and
   combining the segmentation masks and the optical flow maps to generate hybrid segmentation masks.

2. The method of claim 1, wherein combining the segmentation masks and the optical flow maps comprises
   multiplying a pixel-wise code value for red, green, and blue components for sub-pixels of objects which have been applied with the segmentation technique.

3. The method of claim 1, wherein the segmentation technique comprises:
   categorizing each frame of the at least one set of gamma-adjusted frames into a class;
   detecting objects within each frame and drawing boundaries around the objects; and
   identifying and corresponding parts of each frame to the objects.

4. The method of claim 3, wherein each flow map of the optical flow maps is a map of motion of the objects between consecutive frames of the at least one set of gamma-adjusted frames.

5. The method of claim 1, wherein the at least one set of gamma-adjusted frames comprises a first set of gamma-adjusted frames and a second set of gamma-adjusted frames.

6. The method of claim 5, wherein the first set of gamma-adjusted frames is generated for the segmentation technique.

7. The method of claim 5, wherein the second set of gamma-adjusted frames is generated for the optical flow technique.

8. The method of claim 1, further comprising:
   applying the gamma adjustment to the frames of the input video with different values of the parameters to generate different sets of gamma-adjusted frames and repeating the applications and the combination of the segmentation technique and the optical flow technique, when a misalignment exists between the segmentation masks and the optical flow maps.

9. A system, comprising:
   a gamma function applicator to apply a gamma adjustment to frames of an input video using a set of values of parameters to generate at least one set of gamma-adjusted frames;
   a segmentation mask generator to apply a segmentation technique to the at least one set of gamma-adjusted frames to generate segmentation masks;
   an optical flow map generator to apply an optical flow technique to the at least one set of the gamma-adjusted frames to generate optical flow maps; and
   a combiner to combine the segmentation masks and the optical flow maps to generate hybrid segmentation masks.

10. The system of claim 9, further comprising
    a processor to receive the hybrid segmentation masks and to determine if the combiner produced an acceptable alignment between the segmentation masks and the optical flow maps, the processor to instruct the gamma function applicator to use another set of values of the parameters to improve the alignment between the segmentation masks and the optical flow maps and to repeat processes performed by the segmentation mask generator and the optical flow map generator, if the alignment is not acceptable.

11. The system of claim 9, wherein the segmentation mask generator comprises:
    a categorizer to categorize each frame of the at least one set of gamma-adjusted frames into a class;
    a detector to detect objects within each frame and drawing boundaries around the objects; and
    an identifier to identify and correspond parts of each frame to the objects.

12. The system of claim 11, wherein each flow map of the optical flow maps is a map of motion of the objects between consecutive frames of the at least one set of gamma-adjusted frames.

13. The system of claim 9, wherein the at least one set of gamma-adjusted frames comprises a first set of gamma-adjusted frames and a second set of gamma-adjusted frames.

14. The system of claim 13, wherein the first set of gamma-adjusted frames is generated for the segmentation technique.

15. The system of claim 13, wherein the second set of gamma-adjusted frames is generated for the optical flow technique.

16. A non-transitory computer-readable storage medium storing a computer program to generate segmentation masks, the computer program comprising executable instructions that cause a computer to:
    apply a gamma adjustment to frames of an input video with particular values of parameters to generate at least one set of gamma-adjusted frames;
    apply a segmentation technique to the at least one set of gamma-adjusted frames to generate segmentation masks;
    apply an optical flow technique to the at least one set of the gamma-adjusted frames to generate optical flow maps; and
    combine the segmentation masks and the optical flow maps to generate hybrid segmentation masks.

17. The computer-readable storage medium of claim 16, wherein the segmentation technique comprises executable instructions that cause the computer to:
    categorize each frame of the at least one set of gamma-adjusted frames into a class;
    detect objects within each frame and drawing boundaries around the objects; and
    identify and correspond parts of each frame to the objects.

18. The computer-readable storage medium of claim 17, wherein each flow map of the optical flow maps is a map of motion of the objects between consecutive frames of the at least one set of gamma-adjusted frames.

19. The computer-readable storage medium of claim 16, wherein the at least one set of gamma-adjusted frames comprises a first set of gamma-adjusted frames and a second set of gamma-adjusted frames,
wherein the first set of gamma-adjusted frames is generated for the segmentation technique, and
wherein the second set of gamma-adjusted frames is generated for the optical flow technique.

20. The computer-readable storage medium of claim 16, further comprising executable instructions that cause the computer to:
apply the gamma adjustment to the frames of the input video with different values of the parameters to generate different sets of gamma-adjusted frames and repeat the applications and the combination of the segmentation technique and the optical flow technique, when a misalignment exists between the segmentation masks and the optical flow maps.

* * * * *